United States Patent Office 3,542,828
Patented Nov. 24, 1970

3,542,828
HEXAFLUOROANTIMONATE AMINE CATALYSTS
James J. Harris, Pittsburgh, Pa., assignor to Koppers Company, Inc., a corporation of Delaware
No Drawing. Filed Feb. 15, 1968, Ser. No. 710,428
Int. Cl. C07f *9/90*
U.S. Cl. 260—446        2 Claims

ABSTRACT OF THE DISCLOSURE

Hexafluoroantimonate amine salts are useful as catalysts in reactions where acid catalysts are normally used, such as in cationic polymerizations. The use of these salts in the cationic polymerization of vinyl ethers such as ethyl vinyl ether, or cyclic ethers such as propylene oxide, results in high efficiency and gives high molecular weight polymers. The preferred salt, anilinium hexafluoroantimonate can also be used in the form of complex with a cyclic ether.

BACKGROUND OF THE INVENTION

Numerous acidic catalysts are known, including various boron fluoride adducts or salts. In cationic polymerizations, such catalysts generally give low molecular weight polymers and low catalyst efficiency. Although many factors may be responsible for their defects, interaction of the growing polymer chain with the anion has been especially suggested as the reason for such reduction in molecular weight and inefficiency. In addition, such catalysts are often severely affected by small quantities of water or other reagents and the system must be maintained under stringent anhydrous conditions, devoid of foreign material.

SUMMARY OF THE INVENTION

According to the present invention, catalysts of the formula:

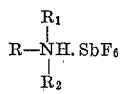

wherein R, $R_1$ and $R_2$ may be hydrogen or the same or different alkyl groups having 1–20 carbon atoms, phenyl, lower alkyl phenyl, lower alkoxy phenyl, or chlorophenyl and at least one of R, $R_1$ and $R_2$ is not hydrogen, are provided. These catalysts, when used in cationic polymerizations are very stable and insensitive towards reagents such as water, alcohols and the like. The catalysts enable the production of high molecular weight polymers and give highly efficient yields of polymer with respect to amount of catalyst used. Especially useful is anilinium hexafluoroantimonate which can also be used in the form of a complex. This complex is formed by the reaction of one mole part of anilinium hexafluoroantimonate and from one to twenty mole parts of a cyclic ether having 2–8 carbon atoms in the ring containing the ether linkage, such as propylene oxide.

DETAILED DESCRIPTION

The amine hexafluoroantimonate salts of the present invention are prepared from the reaction of aqueous fluoroantimonic acid with a suitable amine or by the condensation of antimony pentafluoride with a hydrogen fluoride salt of a suitable amine. Preferably, preparation is by reaction of an alkaline salt of fluoroantimonic acid with an acid salt of the suitable amine. The reaction of the salts of fluoroantimonic acid and the amine leads to a product of higher purity. Thus, aqueous fluoroantimonic acid may be used itself or an alkaline salt of the acid such as a potassium or sodium or the like may be used.

The suitable amines which can be used are those of the formula:

wherein R, $R_1$, and $R_2$ may be hydrogen or alkyl groups having 1–20 carbon atoms, phenyl, lower alkyl phenyl, lower alkoxy phenyl or chlorophenyl, and no more than two of said R, $R_1$, and $R_2$ are hydrogen. Such amines include aniline, diphenylamine, triphenylamine, methylamine, dimethylamine, trimethylamine, ethylamine, diethylamine, triethylamine, hexylamine, nonylamine, trichlorophenylamine, tritolylamine, and the like.

The anilinium hexafluoroantimonate catalyst can also be used in the form of a complex with a cyclic ether having 2–8 carbon atoms in the ring containing the ether linkage. This highly reactive complex is prepared by reacting one mole part of anilinium hexafluoroantimonate with from one to about twenty mole parts of the cyclic ether.

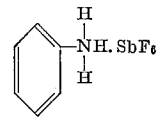

Suitable cyclic ethers, having 2–8 carbon atoms in the ring containing the ether linkage, that form the complex anilinium hexafluoroantimonate are propylene oxide, tetramethylene oxide, phenyl glycidyl ether, 1,2-dioxolane, styrene oxide and the like. The preferred cyclic ether is propylene oxide.

The amount of cyclic ether used to form the complex can be varied from about one to twenty mole parts per mole part of anilinium hexafluoroantimonate. Lesser amounts will not form catalysts having the properties of the catalysts of the present invention while greater amounts give no benefits and are undesirable.

The temperature used during the complex formation can vary over a wide range, with temperatures in the range of −50° C. to about 100° C. being usable, depending upon the reactants and the solvent used.

The reaction time for the complex preparation can also be varied greatly. Since the reaction is generally quite vigorous, the lower limit of reaction time is determined by the ability to control the exotherm of the reaction and is in the order of a few minutes reaction time. The upper limit can be hours, but no advantage is found in extending the reaction time. Preferably, the reaction is carried out during a 10–60 minute period.

To recover the complex, it is only necessary to remove any remaining volatiles in the reaction system and the oily or greasy residue can be used as such. If desired, the complex can be dissolved in a suitable solvent and filtered to remove minute quantities of impurities, but such purification is not necessary.

The novel catalysts of the present invention have been found to be especially useful for the cationic polymerization of cyclic ethers and vinyl ethers. Examples of cyclic ethers, having 2–8 carbon atoms in the ring containing the ether linkage, which can be polymerized by the amine hexafluoroantimonate catalyst are propylene oxide, ethylene oxide, styrene oxide, tetrahydrofuran (trimethylene oxide), cyclohexane oxide, 1,3-dioxolan, epichlorohydrin, diglycidyl ether of bis-phenol A, phenyl glycidyl ether and the like. Examples of vinyl ethers which can be polymerized by the amine hexafluoroantimonates are ethyl vinyl ether, divinyl ether and other vinyl ethers of the formula:

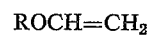

where R is an alkyl or alkenyl group having from 1–10 carbon atoms.

The amount of amine hexafluoroantimonate used as a catalyst for the polymerization of cyclic ethers or vinyl ethers should be generally within the range of $10^{-4}$ to 1 mole percent, i.e. moles of catalyst per mole of monomer to be polymerized. It has been found that molecular weight of the polymers increases slowly with decreasing concentration of catalyst. The yield of polymer has also been found to increase with decreasing concentrations of catalyst.

The temperature range for such polymerizations can be varied over a wide range. Temperatures can be used in the order of $-78°$ C. to about $150°$ C. With the cyclic ethers, temperatures are preferably $-20$ to $150°$ C. For the vinyl ethers, preferred temperatures are in the order of $-78$ to $60°$ C. The polymer yields generally increases with an increase in the reaction temperature.

The polymerization can be carried out as bulk polymerizations, in the absence of solvents or various solvents may be used as diluents for such polymerizations. Aromatic or aliphatic hydrocarbons such as heptane, benzene, acrylonitrile, nitrobenzene, and halogenated derivatives such as methylene chloride or chloroform are useful as solvents in the polymerizations. In effect, any aprotic solvent inert to the reactants having the desired solubility and boiling point are usable as diluents.

The catalysts are surprisingly stable to the presence of water or other hydroxyl-containing compounds during polymeriztaion reactions and thus, provide distinct advantages over heretofore known cationic polymerization catalysts.

The invention is further illustrated by the following examples wherein parts are parts by weight unless otherwise designated.

EXAMPLE I

A mixture of 27.5 g. (0.10 mole) potassium hexafluoroantimonate and 14.2 g. (0.05 mole) aniline sulfate was refluxed three hours in a mixture of 300 ml. isopropanol and 100 ml. benzene (100 ml. liquid had been distilled from the mixture to remove water). Filtering the mixture gave about 10 grams white, insoluble powder shown by infra-red to be mainly potassium sulfate containing an infra-red OH— band and a band at 4.0 M, typical of bonded aniline salts. Removal of the solvent from the filtrate left a slush which was azeotroped in benzene to remove residual isopropanol and filtered. The precipitate consisted of 27.0 grams (0.082 mole) (82% yield) anilinium hexafluoroantimonate, M.P. 195–203° C. Elemental analysis of the crystals gave:

Found (element percent): C, 22.38; H, 2.53; N, 4.44; Sb, 36.82; $F_6$, 35.00. Theory $PhNH_3SbF_6$ (percent): C, 21.84; H, 2.44; N, 4.25; Sb, 36.91; $F_6$, 34.56.

EXAMPLE II

To four dry polymerization tubes, there were charged aliquotas of a catalyst prepared according to Example I. There was then added the desired amount of propylene oxide to each tube and the tubes evacuated and sealed. The tubes were heated to 60° C. and the propylene oxide polymerized as shown in Table I.

TABLE I

| Experiment | 1 | 2 | 3 | 4 |
|---|---|---|---|---|
| Propylene oxide, g | 8.31 | 10.75 | 13.0 | 11.95 |
| Anilinium hexafluoroantimonate, mole percent | 0.05 | 0.01 | 0.005 | 0.0025 |
| Yield, polymer: | | | | |
| Grams | 6.2 | 8.2 | 10.2 | 8.3 |
| Percent | 75 | 76 | 78 | 76 |
| Mv | | 7,250 | 3,630 | 4,500 |

EXAMPLE III

The procedure of Example II was repeated except that diphenylamine hexafluoroantimonate was used as catalyst. The results are shown in Table II.

TABLE II

| Experiment | 1 | 2 | 3 | 4 | 5 |
|---|---|---|---|---|---|
| Propylene oxide, g | 0.2 | 0.2 | 0.2 | 0.2 | 0.2 |
| Diphenylamine hexafluoroantimonate, mole percent | 0.01 | 0.005 | 0.002 | 0.001 | 0.005 |
| Yield, polymer: | | | | | |
| Grams | 8.48 | 9.01 | 9.01 | 7.16 | 0.24 |
| Percent | 73 | 77.5 | 77.5 | 61.6 | 2.1 |
| Mv | 11,370 | 16,610 | 23,860 | 29,810 | |

EXAMPLE IV

A series of experiments were made polymerizing phenyl glycidyl ether was anilinium hexafluoroantimonate as catalyst. An aliquot of a suspension of the weighed catalyst in tetrahydrofuran was added to each of five evacuated polymerization tubes having a self-sealing cap. The tetrahydrofuran was removed at reduced pressure. Then, phenyl glycidyl ether which had been refluxed over, distilled from and stored over calcium hydride was added to the tubes.

After addition of the phenyl glycidyl ether, the tubes were evacuated and sealed. The tubes were heated to 60° C. The polymerization results are listed in Table III.

TABLE III

| Experiment | 1 | 2 | 3 | 4 | 5 |
|---|---|---|---|---|---|
| Phenyl glycidyl ether, moles | 0.0727 | 0.0727 | 0.0727 | 0.0727 | 0.0727 |
| Anilinium hexafluoroantimonate, mole percent | 0.1 | 0.05 | 0.025 | 0.01 | 0.005 |
| Yield, percent polymer | 99 | 99 | 93 | 96 | 98 |

EXAMPLE V

The procedure of Example IV was repeated except that the polymerization was carried out at 0° C. The results are shown in Table IV.

TABLE IV

| Experiment | 1 | 2 | 3 | 4 | 5 |
|---|---|---|---|---|---|
| Phenyl glycidyl ether, moles | 0.0727 | 0.0727 | 0.0727 | 0.0727 | 0.0727 |
| Anilinium hexafluoroantimonate, moles percent | 0.1 | 0.05 | 0.025 | 0.01 | 0.005 |
| Yield, percent polymer | 98.5 | 97.5 | 40.4 | 55.0 | 43.7 |

EXAMPLE VI

The procedure of Example II was repeated in two experiments with methylene chloride added as a solvent. A fifty percent solution of propylene oxide in methylene chloride was used. The experiments and controls (without solvent) are detailed in Table V.

TABLE V

| Experiment | Anilinium hexafluoroantimonate, mole percent | Yield, gr. polymer/ mole catalyst | Molecular weight [1] |
|---|---|---|---|
| 1 | 0.05 | $9.55 \times 10^4$ | 664 |
| Control | 0.05 | $8.7 \times 10^4$ | 1,410 |
| 2 | 0.01 | $4.01 \times 10^5$ | 795 |
| Control | 0.01 | $4.1 \times 10^5$ | 1,580 |

[1] Measured by Mechrolab Vapor Pressure Osmometer.

As can be seen, the use of methylene chloride reduces the molecular weight obtainable from anilinium hexafluoroantimonate catalyzed polymerizations.

EXAMPLE VII

The effect of temperature on the polymer yields in propylene oxide polymerization with anilinium hexafluoroantimonate in 50% methylene chloride is shown in Table VI.

TABLE VI

| Experiment | Mole percent anilinium hexafluoro- antimonate | Yield at temperatures (° C.) | | | | | |
|---|---|---|---|---|---|---|---|
| | | 0° | | 25° | | 60° | |
| | | (A) | Percent | (A) | Percent | (A) | Percent |
| 1 | 0.05 | $3.4 \times 10^3$ | 30 | $9.5 \times 10^3$ | 81 | $1.09 \times 10^4$ | 94 |
| 2 | 1.0 | $2.78 \times 10^3$ | 48 | $5.33 \times 10^3$ | 92 | $5.51 \times 10^3$ | 95 |

(A) Grams polymer/mole catalyst.

It is shown that the polymer yield improves as the reaction temperature is increased.

EXAMPLE VIII

A series of experiments were made to compare the results obtained by the use of anilinium hexafluoroantimonate with those obtained using a conventional catalyst such as anilinium tetrafluoroborate. The polymerization of propylene oxide was carried out at 60° C. in 50% methylene chloride with the following results:

| Catalyst | Mole percent | Yield, percent | Polymer yield, g. polymer/ mole catalyst |
|---|---|---|---|
| Anilinium | 0.5 | 50 | $5.8 \times 10^3$ |
| Tetrafluoroborate | 0.1 | 13 | $7.5 \times 10^3$ |
| | 0.05 | 6 | $7.0 \times 10^3$ |
| | 0.25 | 3.5 | $8.0 \times 10^3$ |
| | 0.01 | 0.8 | $5.0 \times 10^3$ |
| Anilinium | 0.5 | 93 | $1.0 \times 10^4$ |
| Hexafluoroantimonate | 0.1 | 81 | $5.0 \times 10^4$ |
| | 0.05 | 86 | $9.95 \times 10^4$ |
| | 0.25 | 81 | $1.85 \times 10^5$ |
| | 0.01 | 69 | $4.0 \times 10^5$ |

There is evidenced the marked superiority of the anilinium hexafluoroantimonate catalyst. At the lower catalyst concentration, the efficiency of the catalyst is almost 100 times that of the conventional borate catalyst.

EXAMPLE IX

A series of experiments were carried out to polymerize ethyl vinyl ether using anilinium hexafluoroantimonate as catalyst. The reactions were carried out in polymerization tubes using the amounts of reactants and the solvents described in Table VII.

TABLE VII

[Anilinium hexafluoroantimonate-catalyzed polymerization of ethyl vinyl ether at 0° C.]

| Experiment | Catalyst, mole percent | Solvent | Time, hrs. | Yield, percent | G. polymer mole catalyst | Molecular weight | Number chains mole catalyst |
|---|---|---|---|---|---|---|---|
| 1 | 0.01 | n-$C_7H_{14}$ | 88 | 89 | $6.4 \times 10^5$ | $4.36 \times 10^4$ | 14.7 |
| 2 | 0.005 | n-$C_7H_{14}$ | 88 | 96 | $1.38 \times 10^6$ | $4.26 \times 10^4$ | 32.9 |
| 3 | 0.0025 | n-$C_7H_{14}$ | 88 | 92 | $2.64 \times 10^6$ | $1.86 \times 10^5$ | 14.2 |
| 4 | 0.001 | n-$C_7H_{14}$ | 88 | 93 | $6.7 \times 10^6$ | $1.78 \times 10^5$ | 37.6 |
| 5 | 0.5 | $CH_2Cl_2$ | 16 | 91 | $7.5 \times 10^3$ | $2.6 \times 10^4$ | 0.285 |
| 6 | 0.10 | $CH_2Cl_2$ | 16 | 96 | $9.6 \times 10^4$ | $9.34 \times 10^3$ | 7.4 |
| 7 | 0.05 | $CH_2Cl_2$ | 16 | 97 | $1.4 \times 10^5$ | $1.03 \times 10^4$ | 13.6 |
| 8 | 0.01 | $CH_2Cl_2$ | 16 | 100 | $7.2 \times 10^5$ | $1.78 \times 10^4$ | 40.5 |
| 9 | 0.005 | $CH_2Cl_2$ | 16 | 100 | $1.44 \times 10^6$ | $3.4 \times 10^4$ | 41.9 |
| 10 | 0.005 | $CH_2Cl_2$ | 72 | 95 | $1.36 \times 10^6$ | $4.79 \times 10^4$ | 28.4 |
| 11 | 0.0025 | $CH_2Cl_2$ | 72 | 88 | $2.53 \times 10^6$ | $1 \times 10^5$ | 25.3 |
| 12 | 0.0025 | $CH_2Cl_2$ | 72 | 95 | $2.74 \times 10^6$ | $6.65 \times 10^4$ | 41.2 |

EXAMPLE X

The lowering of the temperature of polymerization of ethyl vinyl ether with anilinium hexafluoroantimonate increases the molecular weight of the poly(ethyl vinyl ether) formed as is evidenced by the experiments listed in Table VIII. The experiments were carried out generally according to the procedure in the previous example.

The table shows clearly that at any given catalyst concentrations the molecular weights obtained at −78° are about ten times as great as those obtained at 0°. It is also indicated that the number of chains initiated per mole catalyst at −78° are much fewer than those initiated at 0°.

TABLE VIII

[Effect of temperature of polymerization on the molecular weight of poly(ethyl vinyl ether)]

| Experiment | Catalyst conc., mole percent | Temp., ° C. | Yield, percent | Product | | Number chain mole catalyst |
|---|---|---|---|---|---|---|
| | | | | G. polymer mole catalyst | Molecular weight | |
| 1 | 0.1 | 0 | 96 | $6.9 \times 10^4$ | $9.34 \times 10^3$ | 7.4 |
| 2 | 0.1 | −78 | 85 | $6.24 \times 10^4$ | $1.42 \times 10^5$ | 0.430 |
| 3 | 0.05 | 0 | 97 | $1.4 \times 10^5$ | $1.03 \times 10^4$ | 13.6 |
| 4 | 0.07 | −78 | 83 | $8.65 \times 10^4$ | $1.15 \times 10^5$ | 0.753 |
| 5 | 0.03 | −78 | 90 | $2.16 \times 10^5$ | $1.09 \times 10^5$ | 1.98 |
| 6 | 0.01 | 0 | 100 | $7.2 \times 10^5$ | $1.78 \times 10^4$ | 40.5 |
| 7 | 0.01 | −78 | 96 | $7.25 \times 10^5$ | $1.86 \times 10^5$ | 3.9 |
| 8 | 0.001 | 25 | 92 | $6.6 \times 10^6$ | $3.02 \times 10^4$ | 218 |
| 9 | 0.0005 | 60 | 64 | $9.25 \times 10^6$ | $1 \times 10^4$ | 925 |

EXAMPLE XI

The copolymerization of propylene oxide and ethyl vinyl ether in methylene chloride using anilinium hexafluoroantimonate was carried out by adding to a polymerization tube 4.48 g. propylene oxide, 5.56 g. ethyl vinyl ether (1:1 mole ratio of monomers) and 0.005 mole of catalyst (prepared according to Example I).

The sealed tube was held at 0° C. for 24 hours and then heated to 60° C. and held 24 hours. The yield of copolymers was 8.45 g. or 84%.

EXAMPLE XII

A mixture of 70 parts by weight of an epoxy resin (Epon 820) and 30 parts by weight tetrahydrofuran was prepared by dissolving the tetrahydrofuran (dried over calcium hydroxide) in the epoxy resin. There was added to the mixture in a polymerization tube 2% by weight of anilinium hexafluoroantimonate. The tube was sealed and the monomers cured at room temperature during 48 hours to a hard cured resin.

EXAMPLE XIII

The surprising stability of the catalysts of the present invention to water or other hydroxyl containing contaminants was shown by carrying out polymerizations in the presence of such contaminants which normally poison or deactivate cationic catalysts. To each of six polymerization tubes, there was added 0.1 mole of ethyl vinyl ether, 0.004 mole percent (based on ethyl vinyl ether) of anilinium hexafluoroantimonate, prepared as in Example I and 8.9 ml. of methylene chloride containing the specified amount of water (see Table IX). The tubes were sealed and the monomer polymerized at 0° C. The results of the polymerization are shown in Table IX.

TABLE IX

| Experiment | 1 | 2 | 3 | 4 | 5 | 6 |
|---|---|---|---|---|---|---|
| Water, moles/mole catalyst | 0 | 0.5 | 1.0 | 2.0 | 10.0 | 20.0 |
| Polymer, g | 7.0 | 7.0 | 7.0 | 7.0 | 7.0 | 7.0 |
| Yield, percent | 97 | 97 | 97 | 97 | 97 | 97 |
| N | 0.24 | 0.27 | 0.23 | 0.22 | 0.24 | 0.22 |

Thus, there was no observable effect of water on the catalyst even at quite high mole ratios of water to catalyst. There was slight inhibition of polymerization by high concentrations of water. In Experiments 1–5, polymer appeared in less than 5 minutes with no marked exotherm. Experiment 6 had a vigorous exotherm occurring, following an inhibition period, bringing the tube temperature almost to room temperature.

EXAMPLE XIV

The polymerization of propylene oxide with diphenylamine hexafluoroantimonate in the presence of water was also carried out. Six polymerization tubes were each charged with 0.2 mole of propylene oxide, $2 \times 10^{-6}$ mole of diphenylamine hexafluoroantimonate ($10^{-3}$ mole percent) and the specified amount of water. The effect of the presence of water on the catalyst is shown in Table X.

TABLE X

| Experiment | 1 | 2 | 3 | 4 | 5 | 6 |
|---|---|---|---|---|---|---|
| Water, mole/moles catalyst | 100 | 10 | 5 | 1 | 0.5 | 0.1 |
| Polymer yield: | | | | | | |
| Grams | 4.3 | 3.27 | 5.16 | 4.80 | 5.01 | 5.17 |
| Percent | 37 | 28 | 44.5 | 41.3 | 43.0 | 44.4 |
| Mv | 5,290 | 1,820 | 7,420 | 9,380 | 8,970 | 9,180 |

EXAMPLE XV

The effect of ethylene glycol on the catalysts of the present invention is also negligible. To each of six polymerization tubes, there was added 11.6 ml. propylene oxide and the amount of anilinium hexafluoroantimonate and ethylene glycol specified in Table XI. The tubes were sealed and polymerization carried out at 60° C. The results are shown in Table XI.

TABLE XI

| Experiment | 1 | 2 | 3 | 4 | 5 | 6 |
|---|---|---|---|---|---|---|
| Anilinium hexafluoroantimonate, mole percent | 0.012 | 0.012 | 0.012 | 0.0012 | 0.0012 | 0.0012 |
| Ethylene glycol, ml | 0.22 | 0.11 | 0.056 | 0.22 | 0.11 | 0.056 |
| Polymer yield, percent | 98 | 92 | 92 | 95 | 39 | 77 |

There is thus illustrated the stability of the catalyst with respect to ethylene glycol.

EXAMPLE XVI

A stirred mixture of 2.67 g. (0.008 mole) anilinium hexafluoroantimonate in 10 ml. methylene chloride was reacted at room temperature with 3.0 ml. (0.093 mole) propylene oxide. This quantity of propylene oxide was sufficient to dissolve the anilinium hexafluoroantimonate as it reacted. The mixture was stirred for one hour and the volatiles removed to give a foam which collapsed into an oily mass. The weight of the oil product was 5.2 g.

EXAMPLE XVII

A portion of the catalysts produced according to Example XVI was dissolved in methylene chloride. An aliquot of the solution containing about $1.4 \times 10^{-5}$ moles of catalyst (based on antimony content) was charged to a tube polymerization reactor. At reduced pressure, the methylene chloride was removed to leave the catalyst residue. To this residue, there was added 8.31 g. of propylene oxide monomer. The mixture contained 0.01 mole of catalyst. After heating at 60° C. for a 90-hour period, the polymer produced was recovered. There resulted an 81% yield of polypropylene oxide having an Mv of 4500.

EXAMPLE XVIII

The procedure of Example XVII was repeated in five experiments, using 8.31 g. of propylene oxide and the amount of anilinium hexafluoroantimonatepropylene oxide catalyst specified in Table XII. The results of the polymerizations are listed in Table XII.

TABLE XII

| Experiment | 1 | 2 | 3 | 4 | 5 |
|---|---|---|---|---|---|
| Catalyst, moles | $7.15 \times 10^{-6}$ | $3.6 \times 10^{-6}$ | $1.43 \times 10^{-6}$ | $7.15 \times 10^{-7}$ | $3.6 \times 10^{-7}$ |
| Mole percent | 0.005 | 0.0025 | 0.001 | 0.005 | 0.00025 |
| Yield, percent | 84 | 86 | 81 | 71 | 48 |
| Mv | 9,110 | 9,110 | 9,110 | 8,140 | 16,000 |

What is claimed is:
1. Catalyst of the formula:

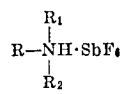

wherein R, $R_1$, and $R_2$ are selected from the group consisting of hydrogen, alkyl groups having 1–20 carbon atoms, phenyl, lower alkyl phenyl, lower alkoxy phenyl and chlorophenyl, and no more than two of said R, $R_1$, and $R_2$ are hydrogen.

2. Anilinium hexafluoroantimonate.

References Cited

UNITED STATES PATENTS

| 3,132,166 | 5/1964 | Harrison | 260—440 |
| 3,440,257 | 4/1969 | Susi et al. | 260—446 X |
| 3,251,881 | 5/1966 | Susi et al. | 260—446 X |

TOBIAS E. LEVOW, Primary Examiner

W. F. W. BELLAMY, Assistant Examiner

U.S. Cl. X.R.

252—431; 260—2, 91.1